United States Patent
Malluru et al.

(10) Patent No.: US 11,301,567 B2
(45) Date of Patent: Apr. 12, 2022

(54) SYSTEMS AND METHODS FOR AUTOMATIC BOOT TO AUTHENTICATED EXTERNAL DEVICE

(71) Applicant: Dell Products L.P., Round Rock, TX (US)

(72) Inventors: Puri R. Malluru, Round Rock, TX (US); Daniel L. Smythia, Austin, TX (US); Ibrahim Sayyed, Georgetown, TX (US); Chris C. Griffin, Cedar Park, TX (US); Anand P. Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 16/779,864

(22) Filed: Feb. 3, 2020

(65) Prior Publication Data
US 2021/0240832 A1 Aug. 5, 2021

(51) Int. Cl.
*G06F 21/57* (2013.01)
*G06F 8/65* (2018.01)
*G06F 21/34* (2013.01)
*G06F 9/4401* (2018.01)
(Continued)

(52) U.S. Cl.
CPC .............. *G06F 21/575* (2013.01); *G06F 8/65* (2013.01); *G06F 9/4406* (2013.01); *G06F 21/34* (2013.01); *G06F 21/572* (2013.01); *G06F 21/577* (2013.01); *G06F 21/602* (2013.01); *G06F 2221/0751* (2013.01)

(58) Field of Classification Search
CPC .... G06F 21/575; G06F 21/572; G06F 21/577; G06F 21/34; G06F 9/4406; G06F 8/65; G06F 21/602; G06F 2221/0751; G06F 9/4401

USPC ................................................. 713/1, 2, 100
See application file for complete search history.

(56) References Cited

U.S. PATENT DOCUMENTS

| 2006/0107320 | A1* | 5/2006 | Bhatt .................... | G06F 21/575 726/22 |
| 2014/0143530 | A1* | 5/2014 | Martinez ............... | G06F 9/4401 713/2 |
| 2016/0147546 | A1* | 5/2016 | Chao ..................... | G06F 9/4403 726/18 |

* cited by examiner

*Primary Examiner* — Michael J Brown
(74) *Attorney, Agent, or Firm* — Jackson Walker L.L.P.

(57) ABSTRACT

An information handling system may include a processor, an external port communicatively coupled to the processor and configured to receive an external information handling resource and couple the external information handling resource to the processor, and a basic input/output system comprising a program of instructions executable by the processor. The program of instructions may be configured to cause the processor to: (i) determine if the external information handling resource coupled via the external port has a signed payload manifest stored thereon, the signed payload manifest comprising information regarding files of a bootable payload stored on the external information handling resource; (ii) if the external information handling resource has a signed payload manifest stored thereon, attempt to authenticate the signed payload manifest; (iii) if the signed payload manifest is authenticated, attempt to verify the files of the bootable payload based on the information with the signed payload manifest regarding files of the bootable payload; (iv) if the files of the bootable payload are verified, attempt to verify a bootable image of the bootable payload; and (v) if the bootable image is verified, cause the information handling system to boot from the bootable payload.

21 Claims, 2 Drawing Sheets

(51) Int. Cl.
*G06F 21/60* (2013.01)
*G06F 9/44* (2018.01)

SYSTEMS AND METHODS FOR AUTOMATIC BOOT TO AUTHENTICATED EXTERNAL DEVICE

TECHNICAL FIELD

The present disclosure relates in general to information handling systems, and more automatically booting an information handling system to an authenticated external storage resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured to receive an external storage resource via an external port located at a periphery of the chassis or other enclosure housing the information handling system. In certain instances, it may be desirable for a user to boot an information handling system from bootable media stored on such an external storage resource. However, the prominence of such devices often make them attractive to attackers, and can be used to perpetuate viruses, malware, spyware, and/or other harmful programs and data to an information handling system or via a network of information handling systems. Thus, it is often desirable that bootable media on an external storage resource be securely authenticated.

Historically, a number of support, recovery, and/or factory tools have been stored to external storage resources that require a user of an information handling system to manually boot an external storage resource to begin use of the tool. Ultimately, using these approaches, a user must understand and successfully follow instructions to manually boot an external storage resource in order to use such tools.

SUMMARY

In accordance with the teachings of the present disclosure, the disadvantages and problems associated with information handling system security and user friendliness when booting from an external storage resource have been reduced or eliminated.

In accordance with embodiments of the present disclosure, an information handling system may include a processor, an external port communicatively coupled to the processor and configured to receive an external information handling resource and couple the external information handling resource to the processor, and a basic input/output system comprising a program of instructions executable by the processor. The program of instructions may be configured to cause the processor to: (i) determine if the external information handling resource coupled via the external port has a signed payload manifest stored thereon, the signed payload manifest comprising information regarding files of a bootable payload stored on the external information handling resource; (ii) if the external information handling resource has a signed payload manifest stored thereon, attempt to authenticate the signed payload manifest; (iii) if the signed payload manifest is authenticated, attempt to verify the files of the bootable payload based on the information with the signed payload manifest regarding files of the bootable payload; (iv) if the files of the bootable payload are verified, attempt to verify a bootable image of the bootable payload; and (v) if the bootable image is verified, cause the information handling system to boot from the bootable payload.

In accordance with these and other embodiments of the present disclosure, a method may include: (i) determining, with a basic input/output system of an information handling system, if an external information handling resource coupled to the information handling system via an external port of the information handling system has a signed payload manifest stored thereon, the signed payload manifest comprising information regarding files of a bootable payload stored on the external information handling resource; (ii) if the external information handling resource has a signed payload manifest stored thereon, attempting, with the basic input/output system, to authenticate the signed payload manifest; (iii) if the signed payload manifest is authenticated, attempting to verify, with the basic input/output system, the files of the bootable payload based on the information with the signed payload manifest regarding files of the bootable payload; (iv) if the files of the bootable payload are verified, attempting to verify, with the basic input/output system, a bootable image of the bootable payload; and (v) if the bootable image is verified, cause the information handling system to boot from the bootable payload.

In accordance with these and other embodiments of the present disclosure, an article of manufacture may include a computer readable medium and computer-executable instructions carried on the computer readable medium, the instructions readable by a processor, the instructions, when read and executed, for causing the processor to: (i) determine, with a basic input/output system of an information handling system, if an external information handling resource coupled to the information handling system via an external port of the information handling system has a signed payload manifest stored thereon, the signed payload manifest comprising information regarding files of a bootable payload stored on the external information handling resource; (ii) if the external information handling resource has a signed payload manifest stored thereon, attempt, with the basic input/output system, to authenticate the signed payload manifest; (iii) if the signed payload manifest is authenticated, attempt to verify, with the basic input/output system, the files of the bootable payload based on the information with the signed payload manifest regarding files of the bootable payload; (iv) if the files of the bootable payload are verified, attempt to verify, with the basic input/output system, a bootable image of the bootable payload;

and (v) if the bootable image is verified, cause the information handling system to boot from the bootable payload.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
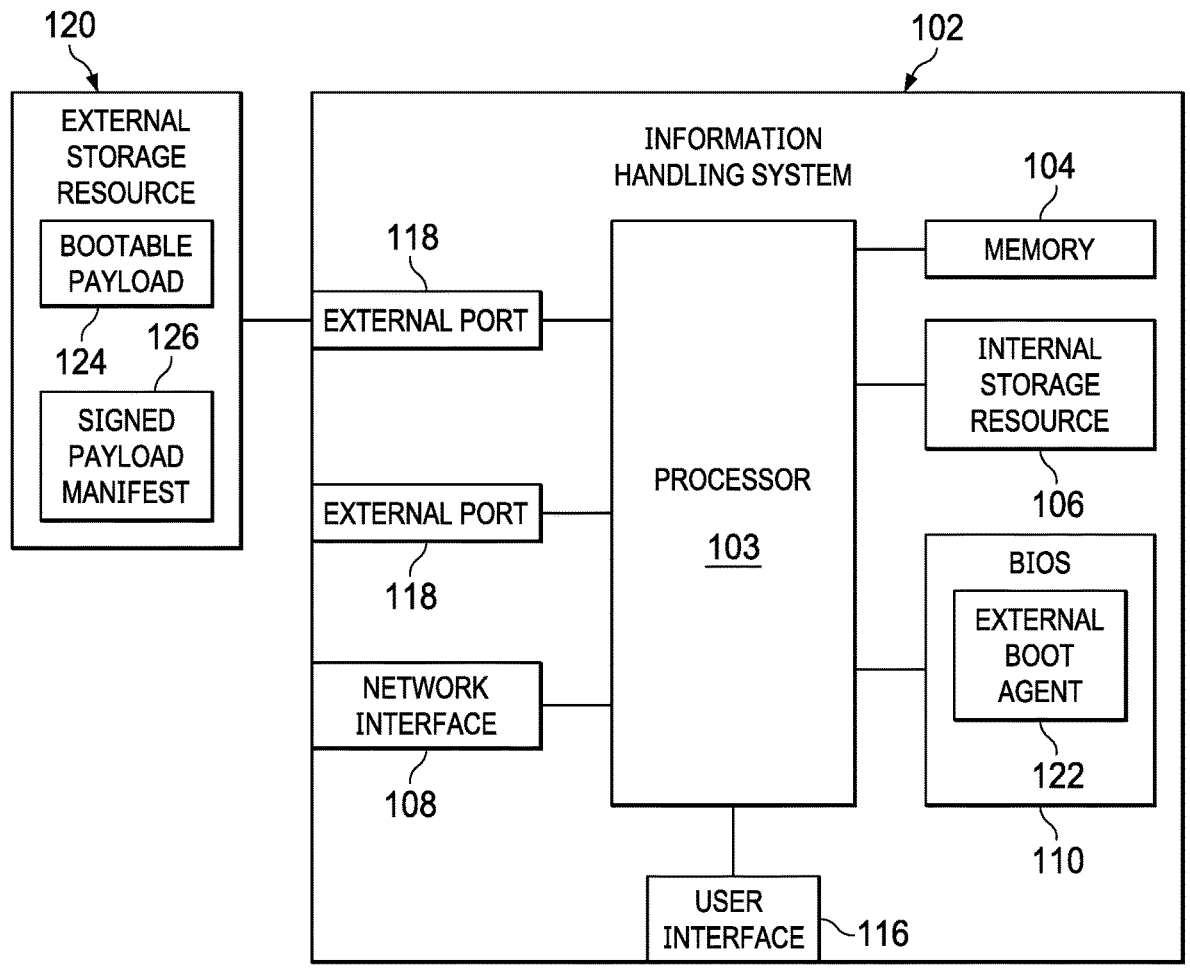
FIG. 1 illustrates a block diagram of an example information handling system adapted to automatically boot to an authenticated external storage resource, in accordance with certain embodiments of the present disclosure.
Figure 2:
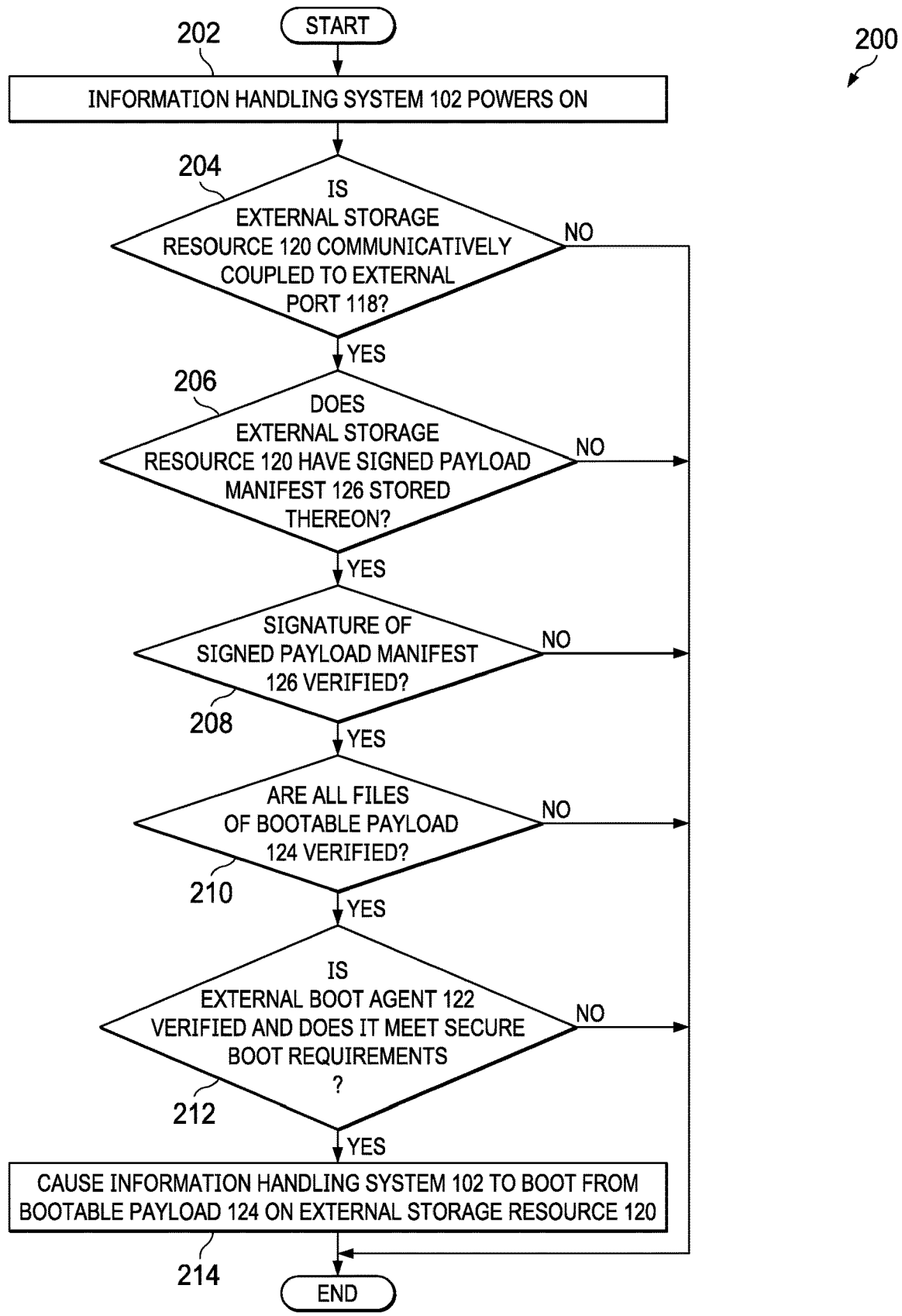
FIG. 2 illustrates a flow chart of an example method for automatically booting to an authenticated external storage resource, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102 adapted to automatically boot to an authenticated external storage resource, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, an internal storage resource 106 communicatively coupled to processor 103, a network interface 108 communicatively coupled to processor 103, a basic input/output system (BIOS) 110 communicatively coupled to processor 103, a user interface 116 coupled to processor 103, and one or more external ports 118 coupled to processor 103 for receiving external devices, including one or more external storage resources 120.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, internal storage resource 106, BIOS 110, an external storage resource 120 coupled via an external port 118, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Internal storage resource 106 may be communicatively coupled to processor 103 and may include any system, device, or apparatus configured to retain program instructions or data for a period of time (e.g., a computer-readable medium). In some embodiments, internal storage resource 106 may include a hard disk drive, a magnetic tape library, an optical disk drive, a magneto-optical disk drive, a compact disc drive, a solid state storage drive, a flash drive and/or any other suitable computer-readable medium. As its name suggests, internal storage resource 106 is intended to reside internal to a chassis or other enclosure comprising information handling system 102 and not be readily accessible without opening such chassis or other enclosure.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may implement an external boot agent 122. As described in greater detail below, external boot agent 122 may be configured to authenticate a signed payload manifest 126 on an external storage resource 120, and if authenticated, cause information handling system 102 to boot from a bootable payload associated with the signed payload manifest 126.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

An external port 118 may comprise an interface for receiving a readily removable external information handling resource attached to an exterior of a chassis or other enclosure housing information handling system 102 and for electrically coupling (e.g., either directly or via electrically-conductive cable) such external information handling resource to processor 103 and/or other components of information handling system 102. An external port 118 may be compliant with any relevant standard or protocol, including without limitation Universal Serial Bus (USB) and Serial Advanced Technology Attachment (SATA).

As shown in FIG. 1, an external device, for example external storage resource 120, may be received by an external port 118. Similar to internal storage resource 106, external storage resource 120 may include any system, device, or apparatus configured to retain program instructions or data for a period of time (e.g., a computer-readable medium) and may include a hard disk drive, a magnetic tape library, an optical disk drive, a magneto-optical disk drive, a compact disc drive, a solid state storage drive, a flash drive and/or any other suitable computer-readable medium. As its name suggests, external storage resource 120 is intended to reside external to a chassis or other enclosure comprising information handling system 102 such that it is readily accessible without opening such chassis or other enclosure.

In certain instances, a user of information handling system 102 may desire to boot from an external storage resource 120, and to do so, may insert an external storage resource 120 with a bootable payload 124 into an external port 118 and boot information handling system 102. In some embodiments, BIOS 110 may cause information handling system 102 to boot automatically to an external storage resource 120 if such external storage resource 120 comprises a signed payload manifest 126 and external boot agent 122, BIOS 110 may require signed payload manifest 126 and external boot agent 122 to both pass signature checks and meet configured secure boot requirements in order to complete autoboot of information handling system 102.

Bootable payload 124 may include any suitable bootable program of instructions or programs of instructions for providing one or more desired tasks with respect to information handling system 102. For example, in some embodiments, bootable payload 124 may include a recovery image for recovering an operating system of information handling system 102. As another example, bootable payload 124 may include an update package for BIOS 110 and/or another component of information handling system 102. Other examples for bootable payload 124 may include factory processes, custom pre-boot actions, and/or any other automated, executable, and uninterruptable process.

Signed payload manifest 126 may include information regarding contents of bootable payload 124 and may be signed with a private cryptographic key that is part of a public-private key pair (e.g., a public-private key pair promulgated by an original equipment manufacturer of information handling system 102) which includes a public cryptographic key stored within or otherwise accessible to BIOS 110. The information regarding contents of bootable payload 124 may describe one or more key files within bootable payload 124 and the respective signatures (e.g., SHA-256 hashes) of such one or more key files. Signed payload manifest 126 may be signed with a private key that may be stored in a secure vault in backend infrastructure. Signed payload manifest 126 may be performed in a secure build environment of information handling system 102 and packaged along with other payload on external storage resource 120. Thus, when validating signatures of signed payload manifest 126, BIOS 110 may use a public key corresponding to the private key.

In operation, for example during power-on/self-test (POST) of BIOS 110, BIOS 110 may determine if an external storage resource 120 is communicatively coupled to an external port 118 having a signed payload manifest 126 stored thereon. If BIOS 110 detects a signed payload manifest 126, BIOS 110 may attempt to verify the signature of signed payload manifest 126 using a public key stored within or otherwise accessible to BIOS 110. If such verification succeeds, BIOS 110 may proceed to verify the signatures of each file of bootable payload 124 described in signed payload manifest 126. If all files of bootable payload 124 are verified (e.g., which may ensure such files are unaltered), external boot agent 122 may cause information handling system 102 to automatically boot from bootable payload 124 on external storage resource 120.

FIG. 2 illustrates a flow chart of an example method 200 for automatically booting to an authenticated external storage resource, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, information handling system 102 may power on. At step 204, during POST of BIOS 110, BIOS 110 may determine if an external storage resource 120 is communicatively coupled to an external port 118. If an external storage resource 120 is communicatively coupled to an external port 118, method 200 may proceed to step 206. Otherwise, method 200 may end.

At step 206, BIOS 110 may determine if external storage resource 120 has a signed payload manifest 126 stored thereon. If BIOS 110 detects a signed payload manifest 126 stored on external storage resource 120, method 200 may proceed to step 208. Otherwise, method 200 may end.

At step 208, responsive to detecting signed payload manifest 126 stored on external boot agent 122, BIOS 110 may attempt to verify the signature of signed payload manifest 126 using a public key stored within or otherwise accessible to BIOS 110. If such verification succeeds, method 200 may proceed to step 210. Otherwise, method 200 may end. In some embodiments, an error message may be communicated (e.g., via user interface 108) indicating a failed verification of payload manifest 126 prior to method 200 ending.

At step 210, responsive to verifying the signature of signed payload manifest 126, BIOS 110 may verify the signatures of each file of bootable payload 124 as described in signed payload manifest 126. If all files of bootable payload 124 are verified (e.g., which may ensure such files are unaltered), method 200 may proceed to step 212. Otherwise, method 200 may end. In some embodiments, an error message may be communicated (e.g., via user interface 108) indicating a failed verification of bootable payload 124 prior to method 200 ending.

At step 212, responsive to verifying the contents of bootable payload 124, BIOS 110 may verify external boot agent 122 and determine if external boot agent 122 meets secure boot requirements of information handling system 102. If external boot agent 122 is verified and meets secure boot requirements of information handling system 102, method 200 may proceed to step 214. Otherwise, method 200 may end. In some embodiments, an error message may be communicated (e.g., via user interface 108) indicating a failed verification of bootable payload 124 prior to method 200 ending.

At step 214, external boot agent 122 may cause information handling system 102 to boot from bootable payload 124 on external storage resource 120. After completion of step 214, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
an external port communicatively coupled to the processor and configured to receive an external information handling resource and couple the external information handling resource to the processor; and
a basic input/output system comprising a program of instructions executable by the processor and configured to cause the processor to:
   determine if the external information handling resource coupled via the external port has a bootable payload and a signed payload manifest stored thereon, the signed payload manifest comprising:
      a payload manifest signature;
      information regarding one or more key files of the bootable payload; and
      signatures for each of the one or more key files of the bootable payload;
   if the external information handling resource has a signed payload manifest stored thereon, attempt to authenticate the signed payload manifest based on the payload manifest signature;
   if the signed payload manifest is authenticated, attempt to verify the one or more key files of the bootable payload based on the signatures for each of the one or more key files of the bootable payload;
   if the files of the bootable payload are verified, attempt to verify an external boot agent; and
   if the external boot agent is verified, cause the information handling system to boot from the bootable payload.

2. The information handling system of claim 1, wherein the external information handling resource is an external storage resource.

3. The information handling system of claim 1, wherein:
the signed payload manifest is signed with a private cryptographic key; and
attempting to authenticate the signed payload manifest comprises authenticating the signed payload manifest using a public cryptographic key stored upon or otherwise accessible to the basic input/output system.

4. The information handling system of claim 1, wherein:
information regarding files of a bootable payload stored on the external information handling resource comprises cryptographic signatures of the files; and
attempting to verify the files of the bootable payload comprises determining if the files within the bootable payload match the cryptographic signatures of the files.

5. The information handling system of claim 1, wherein the bootable payload comprises a program of instructions for recovering an operating system of the information handling system.

6. The information handling system of claim 1, wherein the bootable payload comprises an update package for the basic input/output system.

7. The information handling system of claim 1, wherein the bootable payload comprises an automated and uninterruptable process.

8. A method comprising:
determining, with a basic input/output system of an information handling system, if an external information handling resource coupled to the information handling system via an external port of the information handling system has a bootable payload and a signed payload manifest stored thereon, the signed payload manifest comprising:
   a payload manifest signature;
   information regarding files one or more key files of the bootable payload; and
   signatures for each of the one or more key files of the bootable payload;
if the external information handling resource has a signed payload manifest stored thereon, attempting, with the basic input/output system, to authenticate the signed payload manifest;
if the signed payload manifest is authenticated, attempting to verify, with the basic input/output system, the one or more key files of the bootable payload based on the signatures for each of the one or more key files of the bootable payload;
if the files of the bootable payload are verified, attempting to verify, with the basic input/output system, an external boot agent; and
if the external boot agent is verified, cause the information handling system to boot from the bootable payload.

9. The method of claim 8, wherein the external information handling resource is an external storage resource.

10. The method of claim 8, wherein:
the signed payload manifest is signed with a private cryptographic key; and
attempting to authenticate the signed payload manifest comprises authenticating the signed payload manifest using a public cryptographic key stored upon or otherwise accessible to the basic input/output system.

11. The method of claim 8, wherein:
information regarding files of a bootable payload stored on the external information handling resource comprises cryptographic signatures of the files; and
attempting to verify the files of the bootable payload comprises determining if the files within the bootable payload match the cryptographic signatures of the files.

12. The method of claim 8, wherein the bootable payload comprises a program of instructions for recovering an operating system of the information handling system.

13. The method of claim 8, wherein the bootable payload comprises an update package for the basic input/output system.

14. The method of claim 8, wherein the bootable payload comprises an automated and uninterruptable process.

15. An article of manufacture comprising:
a non-transitory computer readable medium; and
computer-executable instructions carried on the computer readable medium, the instructions readable by a processor, the instructions, when read and executed, for causing the processor to:

determine, with a basic input/output system of an information handling system, if an external information handling resource coupled to the information handling system via an external port of the information handling system has a bootable payload and a signed payload manifest stored thereon, the signed payload manifest comprising;

a payload manifest signature;

information regarding one or more key files of the bootable payload stored on the external information handling resource; and signatures for each of the one or more key files of the bootable payload;

if the external information handling resource has a signed payload manifest stored thereon, attempt, with the basic input/output system, to authenticate the signed payload manifest based on the payload manifest signature;

if the signed payload manifest is authenticated, attempt to verify, with the basic input/output system, the files of the bootable payload based on the signatures for each of the one or more key files of the bootable payload;

if the files of the bootable payload are verified, attempt to verify, with the basic input/output system, an external boot agent; and if the external boot agent is verified, cause the information handling system to boot from the bootable payload.

16. The article of claim 15, wherein the external information handling resource is an external storage resource.

17. The article of claim 15, wherein:

the signed payload manifest is signed with a private cryptographic key; and attempting to authenticate the signed payload manifest comprises authenticating the signed payload manifest using a public cryptographic key stored upon or otherwise accessible to the basic input/output system.

18. The article of claim 15, wherein:

information regarding files of a bootable payload stored on the external information handling resource comprises cryptographic signatures of the files; and attempting to verify the files of the bootable payload comprises determining if the files within the bootable payload match the cryptographic signatures of the files.

19. The article of claim 15, wherein the bootable payload comprises a program of instructions for recovering an operating system of the information handling system.

20. The article of claim 15, wherein the bootable payload comprises an update package for the basic input/output system.

21. The article of claim 15, wherein the bootable payload comprises an automated and uninterruptable process.

* * * * *